Feb. 25, Re. 28,346

SEATING COVER FOR REAR SEATING IN A MOTOR VEHICLE

Original Filed July 22, 1968 6 Sheets-Sheet 1

INVENTORS
HERBERT KOUTH
ALBERT SCHLAPP

BY
McBlew & Toren
ATTORNEYS

SLIDING COVER FOR ROOF OPENING IN A MOTOR VEHICLE

Original Filed July 22, 1968 6 Sheets-Sheet 2

INVENTORS
HERBERT KOUTH
ALBERT SCHLAPP

BY

McGlew & Toren
ATTORNEYS

SLIDING COVER FOR ROOF OPENING IN A MOTOR VEHICLE

Original Filed July 22, 1968 6 Sheets-Sheet 3

INVENTORS
HERBERT KOUTH
ALBERT SCHLAPP

BY

McGlew & Toren
ATTORNEYS

SLIDING COVER FOR ROOF OPENING IN A MOTOR VEHICLE

Original Filed July 22, 1968 6 Sheets-Sheet 4

INVENTORS
HERBERT KOUTH
ALBERT SCHLAPP

BY

McGlew & Toren
ATTORNEYS

SLIDING COVER FOR ROOF OPENING IN A MOTOR VEHICLE

Original Filed July 22, 1968 6 Sheets-Sheet 5

INVENTORS
HERBERT KOUTH
ALBERT SCHLAPP

BY

McGlew & Toren
ATTORNEYS

SLIDING COVER FOR ROOF OPENING IN A MOTOR VEHICLE

Original Filed July 22, 1968 6 Sheets-Sheet 6

INVENTORS
HERBERT KOUTH
ALBERT SCHLAPP

BY

McBlew & Toren
ATTORNEYS

United States Patent

Re. 28,346

Reissued Feb. 25, 1975

28,346

SLIDING COVER FOR ROOF OPENING IN A MOTOR VEHICLE

Herbert Kouth Kilianstadten, and Albert Schlapp, Sprendlingen, Germany, assignors to H. T. Golde G.m.b.H., Frankfurt am Main, Germany

Original No. 3,507,537, dated Apr. 21, 1970, Ser. No. 746,616, July 22, 1968. Application for reissue Apr. 20, 1972, Ser. No. 246,076

Claims priority, application Germany, July 22, 1967, 1,605,960; Apr. 2, 1968, 1,755,128

Int. Cl. B60j *7/04*

U.S. Cl. 296—137 F 25 Claims

Matter enclosed in heavy brackets [ ] appears in the original patent but forms no part of this reissue specification; matter printed in italics indicates the additions made by reissue.

ABSTRACT OF THE DISCLOSURE

A cover for a roof opening in a motor vehicle is supported on a pair of guide rails mounted on a frame attached to the interior surface of the roof. Two spaced guide members ride on each of the rails and are operatively connected to the cover for pivoting it into a ventilating position or for fully displacing it from the opening into a receiving compartment. One guide member is secured in a stationary position relative to the cover while the other guide member is slidable for effecting pivotal movement of the cover.

SUMMARY OF THE INVENTION

The invention is directed to a sliding cover for a roof opening in a motor vehicle and, more particularly, it is concerned with a rigid cover which is pivotally arranged for movement into a ventilating position or can be slidably positioned on guide rails supported on a frame member for displacing the cover from the roof opening into a separate compartment cooperating with the frame.

In sliding roof members for motor vehicles, the full roof opening is frequently not used at higher speeds because of annoying audible and sensible air vibrations, excessive drafts and wind noises which increase with the speed of the vehicle. It has been known to reduce these disadvantageous phenomena by installing an additional wind deflector on the forward edge of the roof cutout. The wind deflector can be rigidly mounted as a separate part which protrudes from the roof surface when the roof opening is closed or it can be retracted as a constructional element with the sliding roof.

In the German Auslegeschrift No. 1,199,638 draft-free ventilation of the vehicle is obtained by using a ventilation flap instead of the usual sliding cover member. A portion of the ventilating flap along its forward edge can be inserted into a pocket in the reinforcing frame located forwardly of the roof opening. In this manner, the rear portion of the ventilation flap forms a wind deflector disposed at a flat angle to the plane of the roof.

When a ventilation flap of the type described above is used, one of its disadvantages is that the widest opening between the rear edge of the flap and the roof opening affords only a relatively narrow ventilation opening which is very small in comparison to the actual size of the roof opening. In the event it is desired to use the full roof opening, the ventilation flap must be disassembled and removed from the opening. Further disadvantages in the use of this type of ventilation flap stem from the location of the pocket for the flap located in the forward part of the roof which requires that the roof opening be disposed further to the rear than in conventional openings and the pocket causes a limitation in the field of vision from the vehicle particularly with the type of windshields presently in use which employ flat roofs.

Still another disadvantage derives from the location of the flap bolt and its operating crank which are disposed outside the normal field of vision of the driver. In such an arrangement, the driver must reach to rear portion of the roof for the crank to move the flap forwardly into its ventilating position.

Accordingly, the primary object of the invention is to provide a cover or closure member for the roof opening in a motor vehicle which is pivotally and slidably supported on a frame member within the vehicle to afford a noiseless and vibration- and draft-free ventilation of the interior of the vehicle, even at higher speeds and without requiring the additional use of a wind deflector.

Another object of the invention is to provide guide rails on the frame with slide members operatively engaging the cover for pivotal movement of the cover and also for slidably displacing the cover into a compartment communicating with the frame.

Still another object of the invention is to provide means for guiding the cover into its displaced position within the compartment so that it is adequately held in place.

Yet, another object of the invention is to provide a slide affixed to the cover within which one of the guide members is slidably positionable for selectively positioning the cover for either pivotal or slidable movement.

Moreover, still another object of the invention is to employ a pressure resistant cable for positioning the cover relative to the opening in the roof.

A further object of the invention is to provide a construction which can be operated easily by the driver of a vehicle, which is securely held in place in its various positions, and which does not hinder the safe operation of the vehicle or cause any obstruction to the field of vision of the driver.

Therefore, in the present invention, the cover or closure member is pivotally arranged in a manner similar to front hinged ventilation flaps, and in addition, can be displaced, in a manner previously known rearwardly from the opening in the roof. By utilizing the cover of the invention, the advantages of both known ventilation flaps and known sliding roof members are obtained without any of their disadvantages.

In the German Utility Model 1,779,679, an adjustable sliding cover for the roof opening in a vehicle is disclosed, however, the cover is pivoted as it is displaced from the opening and is removed into a position located above the roof surface. It will be appreciated that such roof covers, which in the displaced position are located atop the roof, have considerable disadvantages over covers which are stored in a compartment within the roof. Further, additional wind deflectors are required where the cover, in its opened position, is located on the exterior surface of the roof.

In a preferred embodiment of the invention, the cover is mounted by means of the slide members on a pair of guide rails supported on a frame. The frame is secured to the underside of the roof. The cover is pivotally attached to the slide members located on the forward end of the guide rails for use as a ventilation flap. In this embodiment the forward slide members are stationarily positioned relative to the cover, however, the rear slide members are slidably positionable within a grooved slide fixed to the cover for shifting the cover into its pivoted position for use as a ventilation flap.

At its rearward end the groove in the slide is offset to provide a plurality of positions for the slide member interengaged within the groove. In its different positions the cover may be selectively arranged within the opening in the roof as a closure member, or pivoted about the forward slide member into a position as a ventilating flap or displaced rearwardly from the opening for movement into its storage compartment. Normally, the groove in the slide member is arranged in parallel relationship with the guide rail when the cover is in its closed position, however, as the rearward slide member is displaced through the groove, the groove assumes an angular position relative to the guide rail and is arranged in converging relationship toward the forward end of the cover. Preferably, the grooved slide is formed of a flat bar made from an abrasion-resistant plastic material and is secured to the longitudinally extending inner sides of the cover. In this arrangement, rattle-free engagement between the slide members in the grooved slide is accomplished, however, as an alternative, it might be advisable to engage the slide members directly into the side edges of the cover as by punching or a similar operation.

To assure that the cover is not displaced rearwardly until the back slide member is properly positioned within the groove in the slide, a stop arrangement is provided at the forward end of the cover. One stop is located in a stationary position on the frame and a second stop member is attached to the cover engageable with the stop on the frame to prevent rearward displacement of the cover until the back slide member is properly located within the groove. When the cover is positioned for its rearward movement, the stops are disengaged due to the pivoted arrangement of the forward end of the cover.

For properly guiding the cover into its storage compartment, a stationary guide element is located on the frame extending into the storage compartment. As the cover is pivoted for movement into the compartment a tab or flange at its rear section engages in a guide element and properly aligns the cover as it is moved into the storage compartment. By means of this stationary guide, vertical movement of the cover is prevented as it is shifted into the storage compartment. In a preferred arrangement, the stationary guide is formed of an offset plate member which combines with the frame to form a U-shaped groove for receiving a leg of an angle member attached to the cover.

To facilitate the assembly of the cover within the opening and to support it on the frame, it is advantageous if spring loaded guide pins are provided as a part of the rearward slide members to engage the grooved slides attached to the cover.

By employing a one piece deep drawn frame for supporting the stationary stops and guides for the cover, the assembly of the cover is facilitated and additional adjustments of the stops and guides becomes unnecessary. In such an arrangement, when the frame is properly fitted to the roof no subsequent adjustments should be necessary.

Another advantageous feature of the invention is the use of a connecting rod between the rearward slide members to effect a stiffening of their position on the guide rails of the frame. Due to this arrangement, a stable support is provided for the cover even when a maximum pivot angle is employed in displacing the cover into its ventilation flap position. With the cover properly stiffened, it may be disposed into its various positions without any problem of misalignment between the cover and the opening. Moreover, due to the connecting or stiffening rod, the elements connecting the slide members into the grooved slide will not vibrate under driving or wind pressure conditions, and, as a result, vibration and other noises cannot develop.

It is preferable for the connecting or stiffening rod to be rigidly, but detachably, secured to the guide elements of the slide members on the opposite sides of the cover. Because of this arrangement, the guide elements have no undesired radial play in the grooves of the slides. Further, a very rigid connection of the guide elements and the connecting rods is obtained by gripping the guide elements in mouth-like openings at the ends of the connecting rod and then bolting the connecting rods and guide elements together.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

Figure 1:
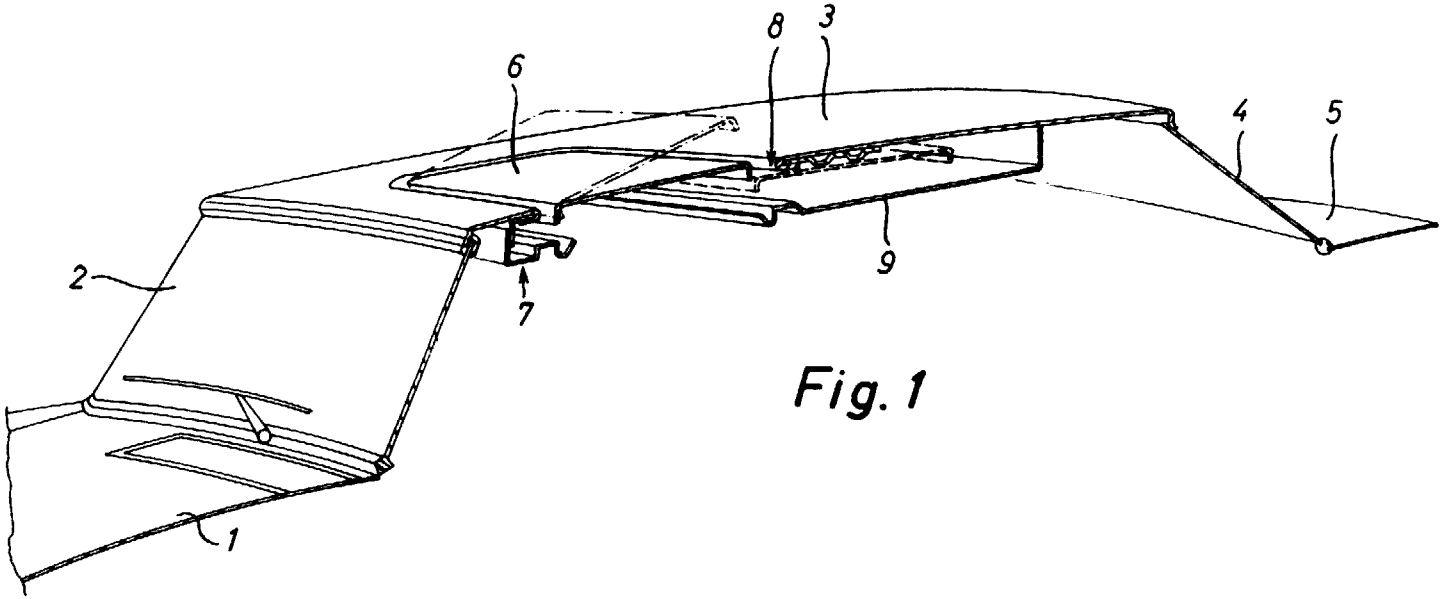
FIG. 1 is a sectional perspective view of a roof and the adjoining portions of a motor vehicle illustrating a cover for an opening in the vehicle roof embodying the present invention.

In FIG. 1, the upper region of a passenger car body is illustrated consisting of a radiator hood 1, a windshield 2, a roof 3, a rear window 4 and a trunk cover 5. In the roof 3, a cutout or opening 8 is framed by a one piece, deep-drawn frame 7. A cover or closure member 6 is provided for the opening 8. In FIG. 1 the cover, shown in full lines, forms a closure for the opening 8, in addition, the cover is shown in dot-dash lines in a ventilating flap position, that is, with the cover in an upwardly sloping position toward the rear of the vehicle, and also in a storage position within a compartment 9 formed rearwardly of the roof opening. The frame 7 is secured to and extends downwardly from the roof 3 and its lower surface projects inwardly below the periphery of the cover member 6 in the opening. The inwardly projecting portion of the cover 7 provides a supporting surface of the cover. Rearwardly of the opening 8, the frame communicates with the storage compartment 9 into which the cover slides when it is removed from the opening 8.

Figure 2:
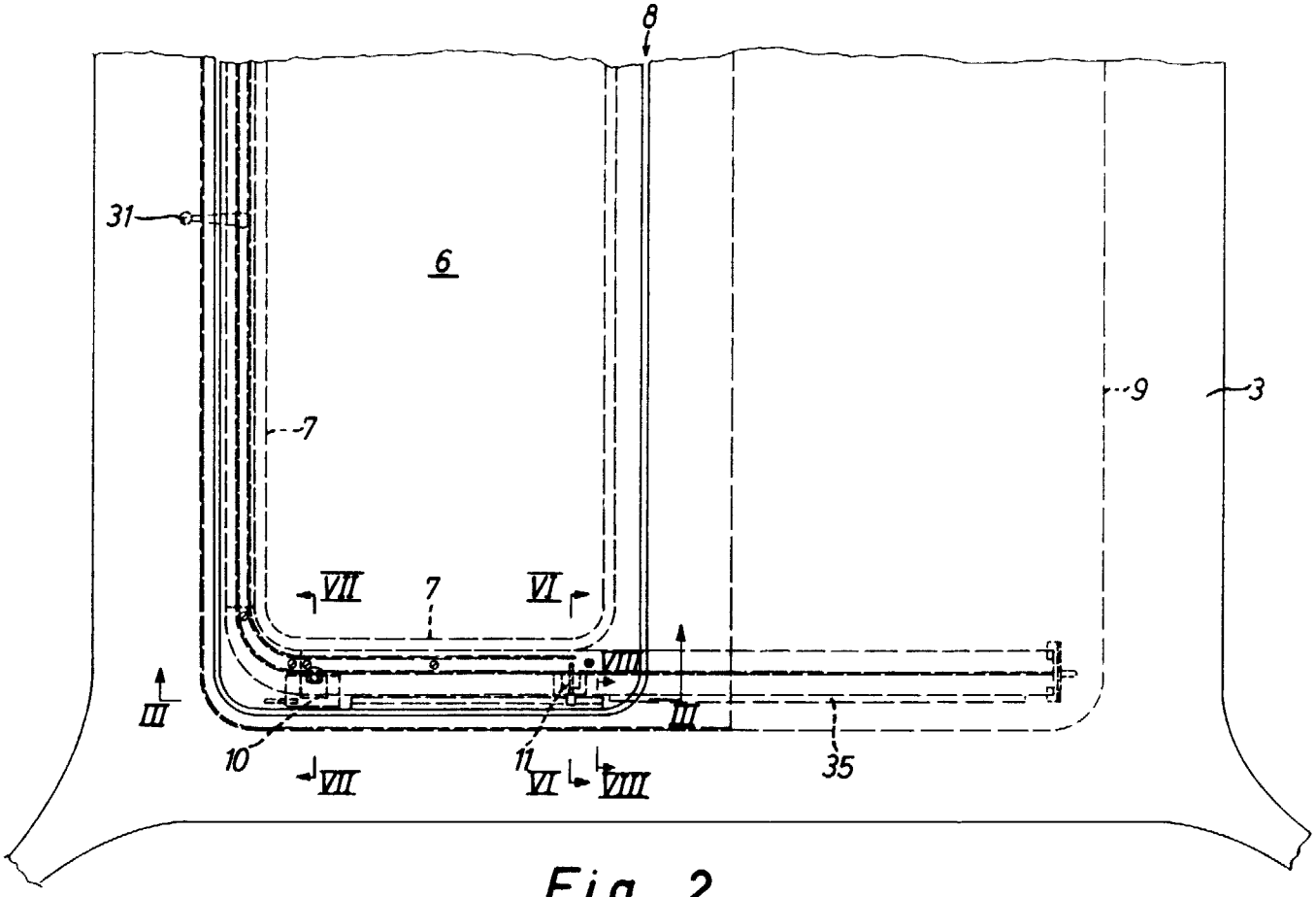
FIG. 2 is a partial top view of the motor vehicle roof shown in FIG. 1.
Figure 7:
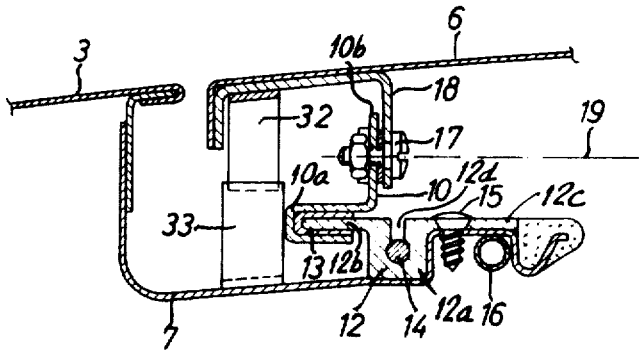
FIG. 7 is a partial sectional view taken along lines VII—VII in FIG. 2.
Figure 8:
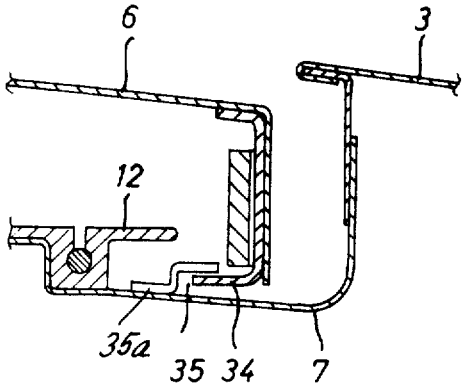
FIG. 8 is a partial sectional view taken along lines VIII—VIII in FIG. 2.
Figure 9:
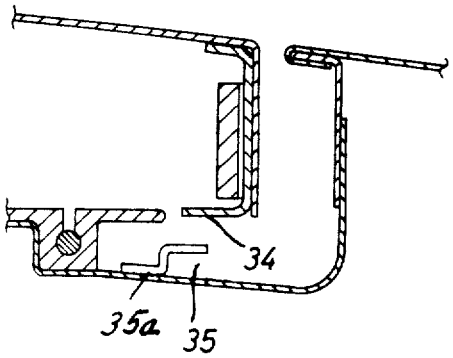
FIG. 9 is a view similar to FIG. 8, however, illustrating the cover member displaced upwardly from its position as shown in FIG. 8.

In FIG. 2, a partial top view of the roof 3 is shown indicating the arrangement of the frame 7 and of the storage compartment or pocket 9. Since the frame and cover are symmetrical about the longitudinal axis of the car only a portion of the roof structure is illustrated. Operatively engaged to the cover 6 is a front or forward slide member 10 and a back or rearward slide member 11. As shown in FIG. 7, the slide member 10 is formed of an angle plate with its horizontally extending leg 10a bent in a U-shaped configuration. Mounted on the frame 7 below the cover 6 and extending along its longitudinally extending side is a guide rail 12 formed of a center section 12a and a pair of oppositely extending side sections 12b, 12c. A generally U-shaped groove 12d is formed in and along the upper surface of the center section 12a of the guide rail and contains the pressure resistant cable 14. The guide rail 12 is secured to the frame 7 along its side section 12c by means of screws 15. Located on the underside of the frame, below the side section 12c, is a receiving tube 16 for the free strand of the cable 14. The construction of and the method of operating the cable for locating the cover in the car roof do not form a part of the present invention and, since they are known in the art, are not further described herein.

The U-shaped leg 10a of the slide member 10 is fitted on the laterally extending side section 12b of the guide rail 12 with a slide lining 13 interposed between the juxtaposed surfaces of the leg 10a and the side section 12b. The vertical leg of the slide member 10 extends upwardly above the guide rail 12 and is attached to a generally channel-shaped plate 18 by means of a step screw 17. The plate 18 is secured to the peripheral edge portion of the cover 6. As indicated in FIG. 7 the axis of the screw 17 forms a horizontal axis 19 (see also FIGS. 3, 4 and 5) extending through the screws on the opposite longitudinally extending sides of the frame. The cover 6 is pivotally positionable about the axis 19. It should be noted that the slide member 10 is attached at a stationary position to the cover 6.

Figures 3, 4, 5:
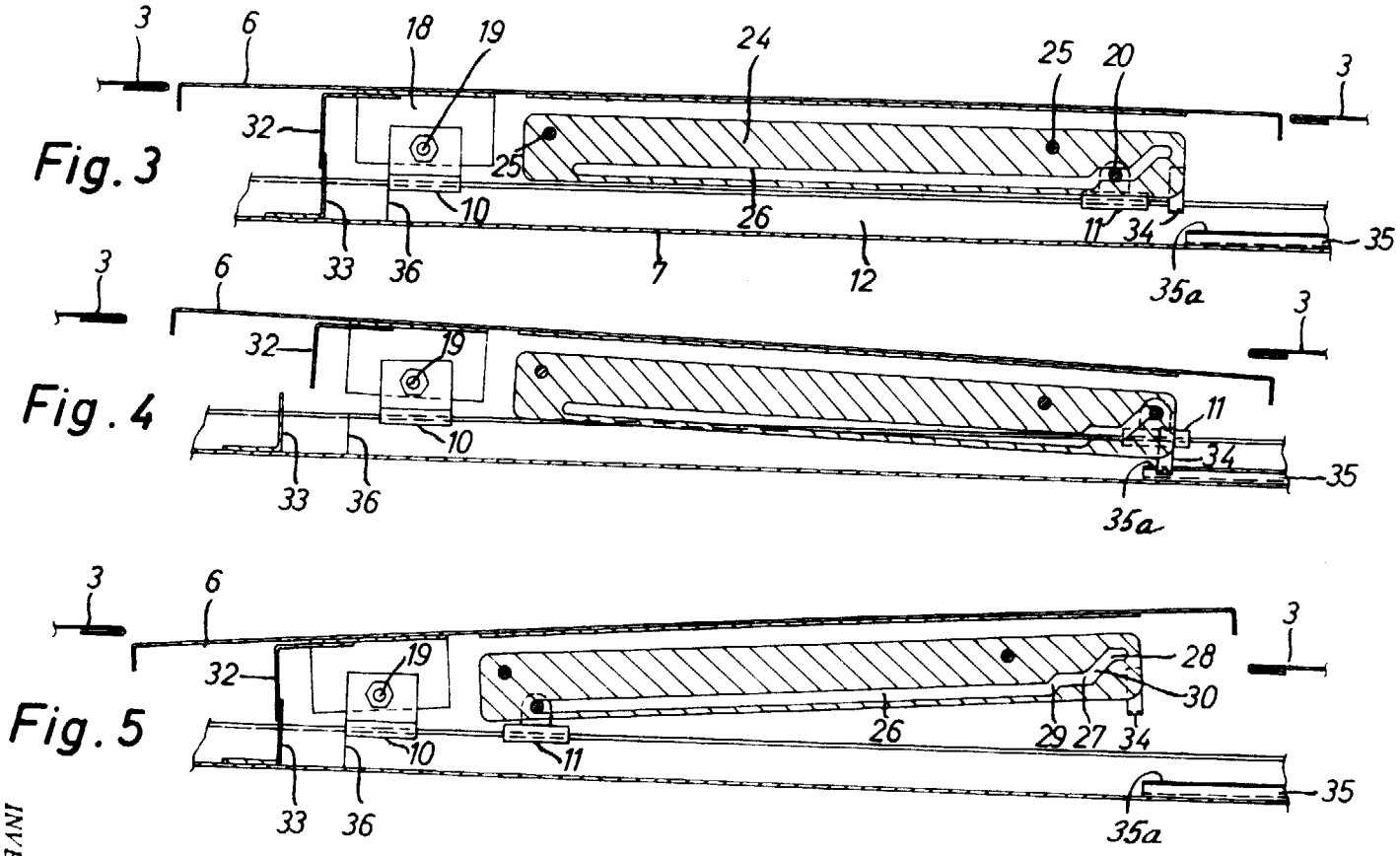
FIG. 3 is a side view taken along line III—III in FIG. 2.
FIG. 4 is a view similar to FIG. 3, however, displaying the cover in a pivoted position for movement rearwardly.
FIG. 5 is a view similar to FIGS. 3 and 4, however, illustrating the cover in a pivoted position for use as a ventilation flap.
Figure 6:
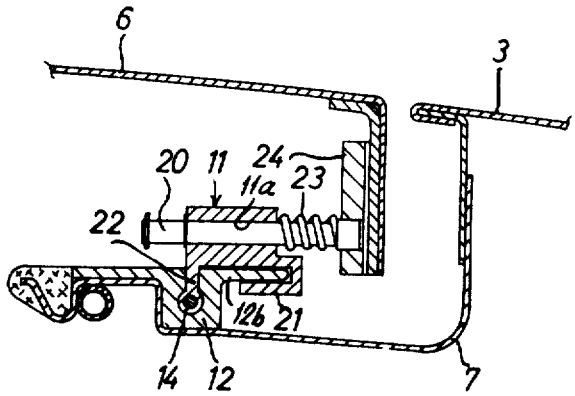
FIG. 6 is a partial sectional view taken along lines VI—VI in FIG. 2.

Positioned at the opposite end of the longitudinally extending side of the frame 7 is the slide member 11, see FIG. 6, and it should be noted in FIGS. 3, 4 and 5, that the slide member 11 is movably positioned relative to the cover 6. The rearward slide member 11 has a U-shaped guide lug *21* attached to one of its lower edges which engages the side section 12b of the guide *rail* [rial] 12. At the other lower edge of the slide member, a follower 22 extends downwardly into the groove 12d in the guide rail and is rigidly connected in a known manner to the cable 14. In addition, an opening 11a extends through the slide member 11, transversely to the longitudinally extending edge of the frame, and provides a bearing sleeve for a guide pin 20. The end of the guide pin 20 is urged by means of a spiral compression *spring* 23 into an oblong guide slot or groove 26 in a slide 24 formed of a flat bar of abrasion-resistant plastic material, for example, poly-ε-caprolactam (Nylon 6). The slide 24 is secured to the downwardly extending edge of the cover 6. During assembly, the guide pin 20 is retracted into the bearing sleeve in the slide member 11 and is disengaged from the slot 26 in the slide 24. As indicated in FIGS. 3, 4 and 5, the slide 24 is secured to the cover by means of rivets or screw bolts 25.

With reference to FIGS. 3, 4 and 5, the oblong guide slot 26 in the slide 24 extends for substantially the length of the slide. For a major portion of its length, the slot 26 provides a continuous straight groove extending from the forward end of the slide to a point closely spaced from its rearward end. At its rearward end, the slot 26 has a transition section 29 which connects the main slot portion 26 with an intermediate slot section 27 which, in turn, is connected through another transition section 30 with an end slot section 28. In FIG. 3, the cover 6 is shown in its closed position within the opening 8 in the roof 3, in this position, the guide pin 20 is located within the intermediate slot section 27. When the cover is to be moved into the storage compartment 9, a crank 31, as shown in FIG. 2, is turned to effect the displacement of the slide member 11 rearwardly whereby the guide pin 20 is urged through the transition section 30 into the end slot section 28, see FIG. 4. In FIG. 4 the cover is shown displaced a short distance rearwardly from the position shown in FIG. *5* [4].

At the forward end of the frame, a stop section 33 is secured to the frame ahead of the position of the slide member 10 shown in FIG. 3 and a stop section 32 is attached to the undersurface of the cover 6, see FIG. 7. The stop section 32 extends downwardly into contacting relationship with the stop section 33, and, in this position, prevents any rearward movement of the cover. However, when the guide pin is moved into the end slot section 28, the cover, at its rearward end, drops and causes the forward end to pivot about the horizontal axis 19 disengaging the stops 32 and 33. At the rearward end of the slide 24, an angle-shaped projection 34 extends inwardly toward the guide rail 12 mounted on the frame. As the rearward end of the cover pivots downwardly, this projection 34 becomes aligned with a groove 35 which extends from a point immediately rearwardly of the slide, in the closed position of the cover 6, into the compartment 9, note FIG. 2. The groove 35 is provided by an angle-shaped plate 35a having one leg attached to the bottom of the frame and an angle-shaped section extending upwardly from that leg and providing a U-shaped grove into which the projection 34 fits as the cover is moved rearwardly from the position shown in FIG. 3 into that shown in FIG. 4. When the projection 34 is engaged within the groove 35, the cover is held in a downward position so that it slides below the roof 3 into the compartment 9. By holding the cover downwardly, it is not possible for the guide pin 20 to slide through the transition section 30 and lift the cover so that it slides againsst the undersurface of the roof 3. With the guide pin 20 disposed within the end slot section 28, the cover can be slid in the rearward direction into the compartment 9 leaving the opening 8 in the roof unobstructed.

When the cover is being replaced in the opening 8, from the compartment 9, it slides along the guide *rail* [rial] 12 until the forward edge of the slide member 10 comes in contact with the leading edge 36 of the guide rail 12. When its position is reached, as can be noted in FIGS. 3 and 5, the projection 34 is disengaged from the groove 35 and by turning the crank 31 in the opposite direction to that mentioned above, the guide pin 20 is moved from the end slot 28 through the transition section 30 into the intermediate slot section 27 and the cover is moved into the closed position as shown in FIG. 3. A suitable ratchet may be provided on the crank drive for locating the closed position. As the cover moves from the compartment 9 back into the opening 8 in the roof, the stop section 32 rides over the top of stop section 33 and then when the cover is lifted upwardly at its rearward end, the front end of the cover pivots about the axis 19 and the stop section 32 again becomes engaged with the stop section 33.

If the crank 31 is continued to be turned in the direction just mentioned for moving the guide pin from the end slot section to the intermediate slot section 27, the guide pin is continued through the transition section 29 into the main slot 26. With the guide pin within the main slot 26, it is possible to move the slide member 11 along the guide rail 12 in the forward direction and, as this movement takes place, the cover is continuously pivoted about the axis 19 so that its rearward end is lifted above the adjacent roof section 3 and its forward end is pivoted downwardly below the adjacent section of the roof 3. As the slide member 11 is moved through the slot 26, the cover member is prevented from movement forwardly by the edge 36 which prevents the forward slide member 10 from movement in the forward direction along the slide or guide rail 12. In the closed position of the cover, the slot 26 extends in parallel relationship with guide rail 12, however, as the slide member 11 is moved in the forward direction through the slot 26, the slot forms an increasingly greater angle with the guide rail until the slide member 11 reaches the forward end of the main slot 26. If the slot 26 in the slide 24 is initially disposed at an angle diverging from the guide rail, then as the slide member 11 and the guide pin 20 pass through the slot larger pivot angles can be obtained.

When the cover 6 is being pivoted from the position shown in FIG. 5 to the closed position shown in FIG. 3, the engagement of the stops 32, 33 prevent any rearward movement of the cover due to the passage of the slide member 11 through the main slot 26 in the slide 24.

When the slide reaches the rearward end of the main slot 26, it is again repositioned within the intermediate slot section 27 by means of the crank 31.

Figure 10:
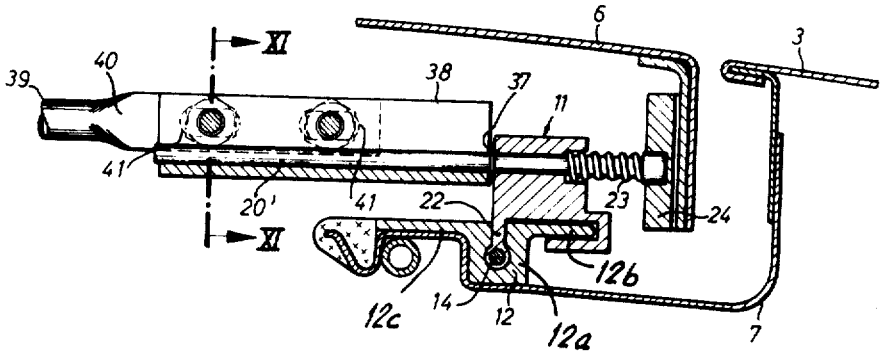
FIG. 10 is a view similar to FIG. 6 indicating an alternate embodiment of the invention.
Figure 11:
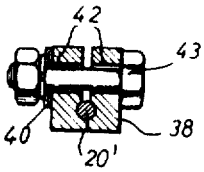
FIG. 11 is a cross sectional view taken along the line XI—XI shown in FIG. 10.

To provide proper reinforcement and stiffening for the cover 6 at the location of the slide member 11, one embodiment of a reinforcement member for counteracting cover vibrations and rattling noises as well as for overcoming any tendency of the cover to become canted within the opening is shown in FIG. 10 and FIG. 11. The section shown in FIG. 10 is similar to that shown in FIG. 6 with the rearward slide member 11 mounted on the guide rail 12 and engaged within the slide 24 on the cover by means of the guide pin 20'. The abutment for the displacement of the guide pin 20' from the slide 24 is provided by means of a safety locking washer 37.

As shown in FIG. 11, the guide pin 20' is fitted within a slotted clamping piece 38 which is formed preferably of a suitable plastic material, such as a polyamide. The clamping piece 38 is secured to the flattened end part 40 of the connecting rod 39 which is represented as a tubular construction formed of a steel member or the like. As indicated in FIG. 10, oblong slots are provided through the flattened end part 40 to compensate for any dimensional differences which might occur. Bolts 43 extend through bores 42 in the clamping piece 38 and the flattened end part 40 and are tightened to securely grip the guide pin within the slot in the clamping piece 38. In this manner, a rigid connection is effected between the clamping piece 38, the connecting rod 39 and the guide pin 20'.

It will be appreciated that the sliding cover may be operated by an electrical cable drive.

What is claimed is:

1. A motor vehicle body construction comprising a roof having an opening therein, a frame being secured to said roof and extending about and downwardly from the opening in said roof, said frame having a pair of oppositely disposed longitudinally extending sides, a pair of guide rails being supported by said frame and each of said guide rails extending along one of said longitudinally extending sides, a cover being mounted on and slidably positionable along said frame in the direction of said longitudinally extending sides, first means being located on each said longitudinally extending side of said frame and mounted on said guide rails, said first means being attached to said cover for sliding said cover along said guide rail and for pivoting said cover about an axis extending through said first means on the oppositely disposed longitudinally extending sides of said frame, second means being located on each said longitudinally extending side of said frame and mounted on said guide rails in spaced relationship with said first means, a pair of slides each being fixed to and extending along one of the sides of said cover disposed in parallel relationship with the longitudinally extending sides of said frame, said second means being slidably engageable in said slides for cooperating in positioning said cover relative to said opening.

2. A motor vehicle body construction, as set forth in claim 1, comprising cable means extending through said guide rails and operatively connected through said second means to said cover for movably displacing said cover relative to the opening in said roof.

3. A motor vehicle body construction, as set forth in claim 1, wherein said guide rail comprises a longitudinally extending center section and a pair of flange-like side sections extending laterally outwardly from and longitudinally along said center section.

4. A motor vehicle body construction, as set forth in claim 3, wherein a longitudinally extending groove is formed within and extends along the center section of said guide rail.

5. A motor vehicle body construction, as set forth in claim 3, wherein said first means comprising a slide member being engaged with one of the flange-like side sections of said guide rail, and a plate member being secured to said first slide member and attached to said cover.

6. A motor vehicle body construction as set forth in claim 5, wherein said first slide member comprises an angular-shaped plate section having a horizontally disposed leg formed in a U-shaped configuration to fit in sliding engagement on said flange-like side section of said guide rail, and a vertical leg extending upwardly from said horizontal leg and having an opening therethrough.

7. A motor vehicle body construction, as set forth in claim 6, wherein a slide lining being fitted within the U-shaped horizontal leg of said first slide member and interposed between the juxtaposed surfaces of said first slide member and said guide rail.

8. A motor vehicle body construction, as set forth in claim 7, wherein said plate member secured to said cover has an opening therethrough aligned with the opening in the vertical leg of said first slide member, a bolt member disposed through the opening in said plate member and said first slide member for securing the members together and for pivotally mounting said plate member and said cover relative to said first slide member.

9. A motor vehicle body construction, as set forth in claim 1, wherein said second means comprises a second slide member having a U-shaped lug secured thereto and being fitted on one of said side sections of said guide rail in sliding relationship therewith, and means being mounted in second slide member and engageably within said slide secured to said cover.

10. A motor vehicle body construction, as set forth in claim 9, wherein said slide comprises a flat plate member having a slot extending longitudinally therethrough, and said means being mounted in said second member and engageable with said slide comprising a guide pin mounted in said second slide member and extending therefrom and having one end engaged within the slot in said slide.

11. A motor vehicle body construction, as set forth in claim 10, wherein a spring is mounted on said guide pin for urging said guide pin into the slot in said slide.

12. A motor vehicle body construction, as set forth in claim 11, wherein a follower member extends downwardly from said second slide member into the groove in said guide rail and is adapted to be rigidly connected to a cable for slidably positioning said cover relative to the opening in said roof.

13. A motor vehicle body construction, as set forth in claim 11, wherein the slot in said slide is formed of a longitudinally extending first slot section extending for the major portion of said slide, a first transition section extending from one end of and angularly disposed relative to the longitudinal axis of said first slot section, an intermediate slot section extending from said first transition slot section in the opposite direction from said first slot section and disposed in parallel and offset relationship to said first slot section, a second transition slot section extending from the opposite end of and angularly disposed to said intermediate slot section, and an end slot section connected to said second transition slot section and extending therefrom in a direction away from said first slot section and being disposed in parallel and offset relationship with said first slot section.

14. A motor vehicle body construction, as set forth in claim 1, wherein a first stop section is secured to said frame adjacent the forward end of said cover, a second stop attached to said cover and arranged above said first stop section when said cover is positioned in the opening in said roof, whereby when said cover is disposed within the opening in said roof, said stop sections are arranged to prevent any rearward movement of said cover relative to the opening in the roof and when said cover is pivoted relative to said frame, said stops are disengaged for movement of said cover relative to said opening in said roof.

15. A motor vehicle body construction, as set forth in claim 1, wherein an angle-shaped plate member is attached to said frame and extends rearwardly thereon from a location immediately adjacent and spaced rearwardly from the rearward end of said slide when said cover is in the closed position in the opening in said roof, said plate combining with said frame for forming a groove, a projection secured to said cover at the rearward end of said slide and being arranged to fit within and slide through the groove formed by said plate when said cover is moved rearwardly from the opening in said roof.

16. A motor vehicle body construction, as set forth in claim 1, wherein a crank member is secured to said roof for operatively positioning said second means relative to said slide whereby said cover can be pivotally and slidably positioned relative to the opening in said roof.

17. A motor vehicle body construction, as set forth in claim 1, wherein wall means are secured to the undersurface of said roof and cooperate with said frame rearwardly of the location of the opening in said roof for forming a storage compartment for said cover when said cover is movably displaced rearwardly from the opening in said roof.

18. A motor vehicle body construction, as set forth in claim 1, wherein a transverse connector member extends between said second means on the opposite sides of said frame for properly securing said second means into engagement with said slides on said cover.

19. A motor vehicle body construction, as set forth in claim 18, wherein said connector member comprises a tubular member, a flattened part of said tubular member extending from each of its opposite ends, a connector section secured to the flattened ends of said tubular member, and means for securing said connector section to said tubular member and to said second means.

*20. A motor vehicle body construction comprising a roof having an opening therein, support means secured to said roof and extending about and downwardly from the opening in said roof, said support means located along a pair of oppositely disposed longitudinally extending sides of the opening, a pair of guide rails supported by said support means and each of said guide rails extending along one of said longitudinally extending sides, a cover mounted on and slidably positionable along said support means in the direction of said longitudinally extending sides, first means located on each said longitudinally extending side of said support means and mounted on said guide rails, said first means attached to said cover for sliding said cover along said guide rail and for pivoting said cover about an axis extending through said first means on the oppositely disposed longitudinally extending sides of said support means, second means located on each said longitudinally extending side of said support means and mounted on said guide rails in spaced relationship with said first means, cover displacement means secured to said cover adjacent at least one end of said longitudinally extending sides of said support means, and said second means being slidably engageable with said cover displacement means for cooperating in positioning said cover relative to said opening.*

*21. A motor vehicle body construction comprising a roof having an opening therein, a frame secured to said roof and extending about and downwardly from the opening in said roof, said frame having a pair of oppositely disposed longitudinally extending sides, a pair of guide rails supported by said frame and each of said guide rails extending along one of said longitudinally extending sides, a cover mounted on and slidably positionable along said frame in the direction of said longitudinally extending sides, first means located on each said longitudinally extending side of said frame and mounted on said guide rails, said first means attached to said cover for sliding said cover along said guide rail and for pivoting said cover about an axis extending through said first means on the oppositely disposed longitudinally extending sides of said frame, second means located on each said longitudinally extending side of said frame and mounted on said guide rails in spaced relationship with said first means, cover displacement means secured to said cover, and said second means being slidably engageable with said cover displacement means for cooperating in positioning said cover relative to said opening.*

*22. A motor vehicle body construction, as set forth in claim 21, comprising cable means operatively connected through said second means and cover displacement means to said cover for movably displacing said cover relative to the opening in said roof.*

*23. A motor vehicle body construction, as set forth in claim 21, wherein a crank member is secured to said roof, a cable means connecting said cable to said second means for operatively positioning said second means relative to said cover displacement means whereby said cover can be pivotally and slidably positioned relative to the opening in said roof.*

*24. A motor vehicle body construction, as set forth in claim 21, wherein wall means are secured to the undersurface of said roof and cooperate with said frame rearwardly of the location of the opening in said roof for forming a storage compartment for said cover when said cover is movably displaced rearwardly from the opening in said roof.*

*25. A motor vehicle body construction, as set forth in claim 21, wherein said cover displacement means comprises a pair of slides each fixed to and extending along one of the sides of said cover disposed in parallel relationship with the longitudinally extending sides of said frame.*

References Cited

The following references, cited by the Examiner, are of record in the patented file of this patent or the original patent.

UNITED STATES PATENTS

| | | | |
|---|---|---|---|
| 2,012,386 | 8/1935 | Genberg | 49—128 |
| 2,338,309 | 1/1944 | Votypka | 296—137 F |
| 2,410,332 | 10/1946 | Ball | 296—137 F |
| 2,550,323 | 4/1951 | Bishop | 296—137 E |
| 3,031,226 | 4/1962 | Larche | 296—137 F |
| 3,033,608 | 5/1962 | Golde | 296—137 E |
| 3,075,807 | 1/1963 | Werner | 296—137 G |
| 3,414,320 | 12/1968 | Heim | 296—137 E |

FOREIGN PATENTS

| | | | |
|---|---|---|---|
| 772,198 | 8/1934 | France | 296—137 E |
| 1,306,244 | 9/1962 | France | 296—137 G |
| 619,494 | 2/1961 | Italy. | |
| 1,119,689 | 12/1961 | Germany | 296—137 E |
| 1,155,986 | 10/1963 | Germany | 296—137 E |
| 1,199,638 | 8/1965 | Germany. | |

ROBERT G. SHERIDAN, Primary Examiner

L. J. PAPERNER, Assistant Examiner

U.S. Cl. X.R.

49—211, 214